Aug. 23, 1955 P. S. MORGAN 2,715,925
BALL AND INCLINED RACE MECHANICAL MOVEMENTS
Filed June 12, 1952 5 Sheets-Sheet 1
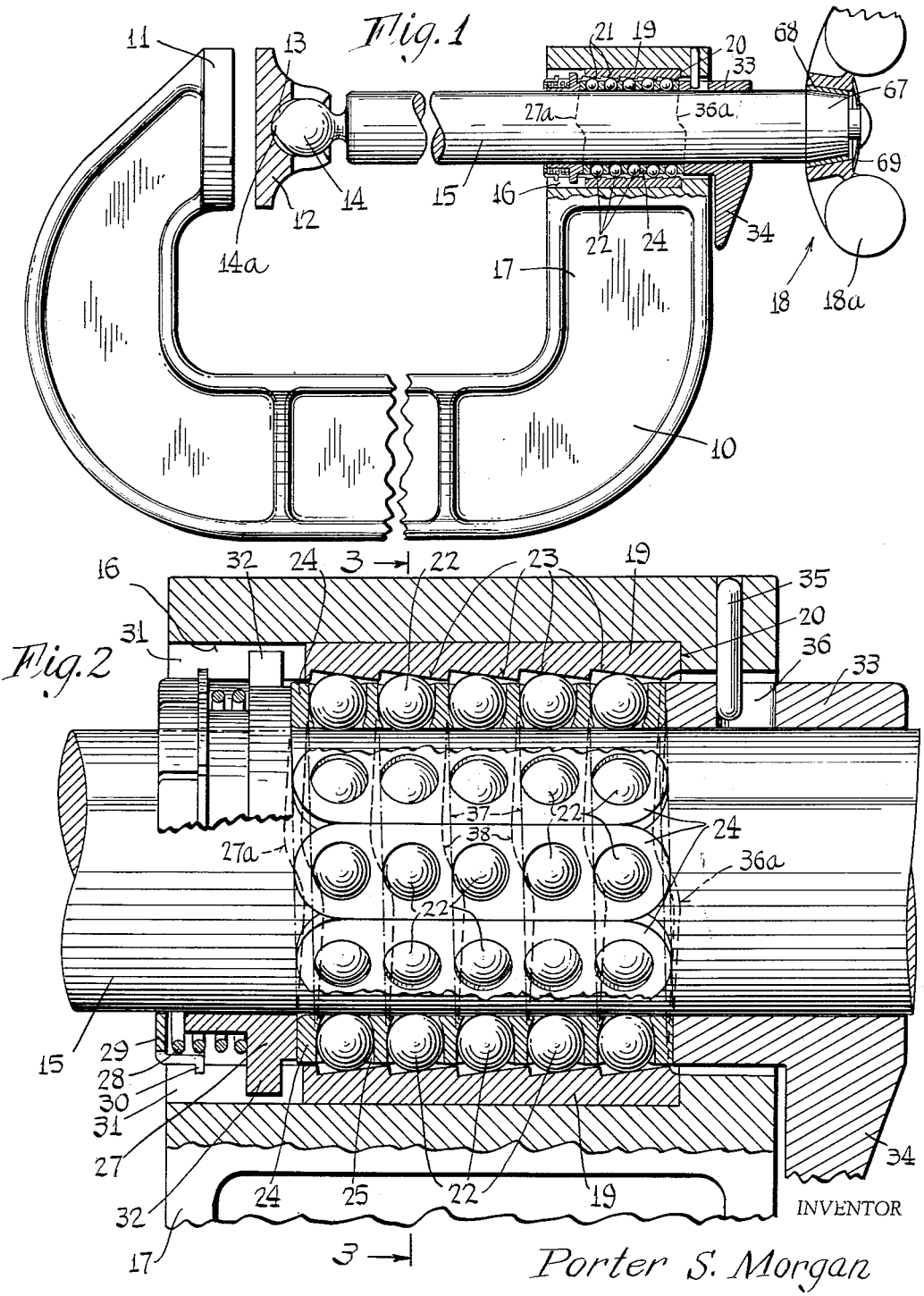
INVENTOR
Porter S. Morgan
BY Johnson and Kline
ATTORNEYS

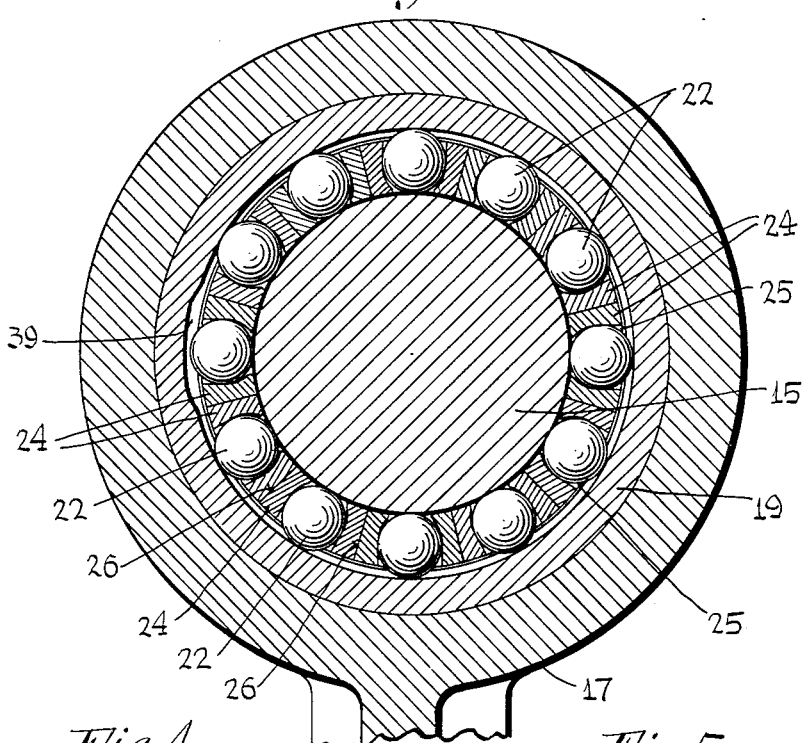
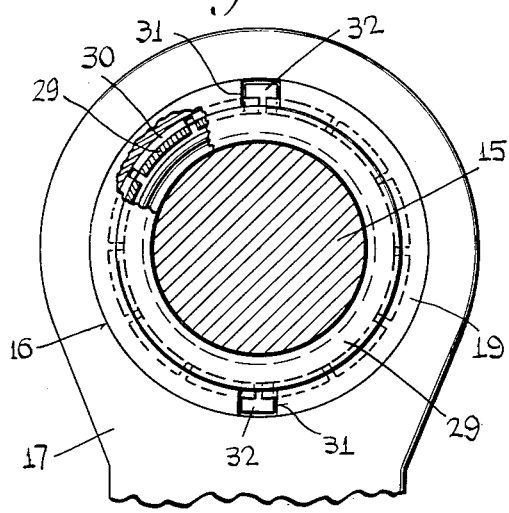
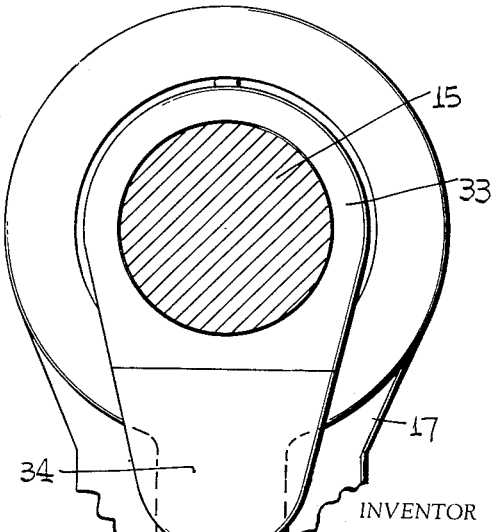

Aug. 23, 1955  P. S. MORGAN  2,715,925
BALL AND INCLINED RACE MECHANICAL MOVEMENTS
Filed June 12, 1952  5 Sheets-Sheet 3

INVENTOR
Porter S. Morgan
BY Johnson and Kline
ATTORNEYS

Aug. 23, 1955 P. S. MORGAN 2,715,925
BALL AND INCLINED RACE MECHANICAL MOVEMENTS
Filed June 12, 1952 5 Sheets-Sheet 4
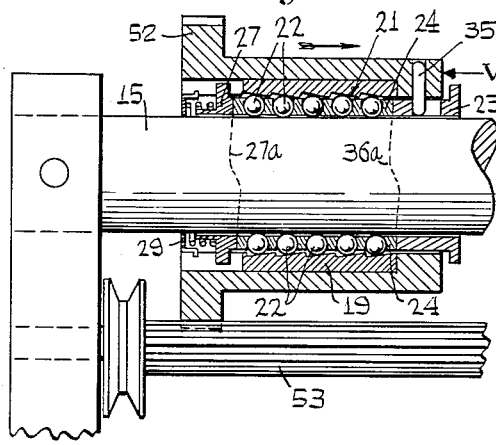
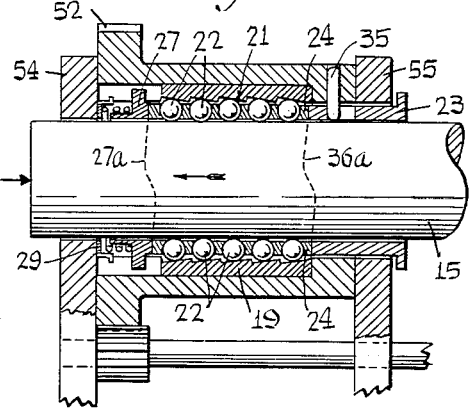
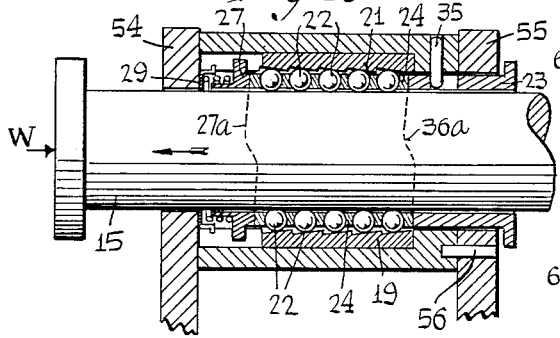
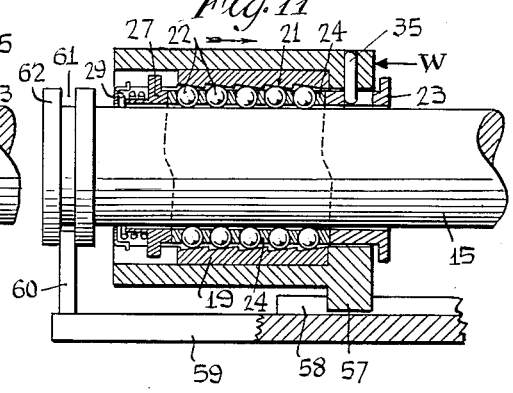
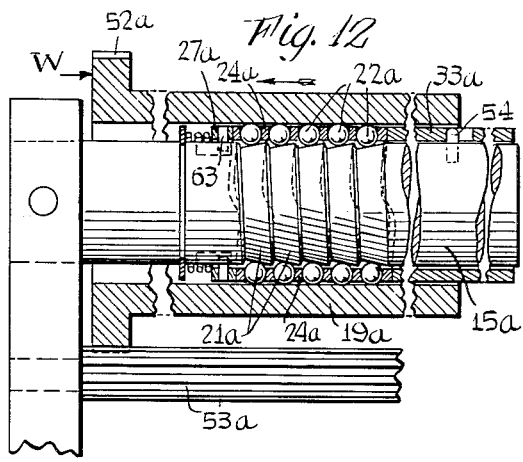
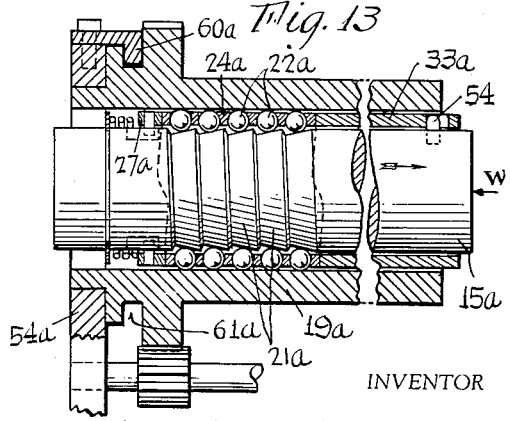
INVENTOR
Porter S. Morgan
BY Johnson and Kline
ATTORNEYS

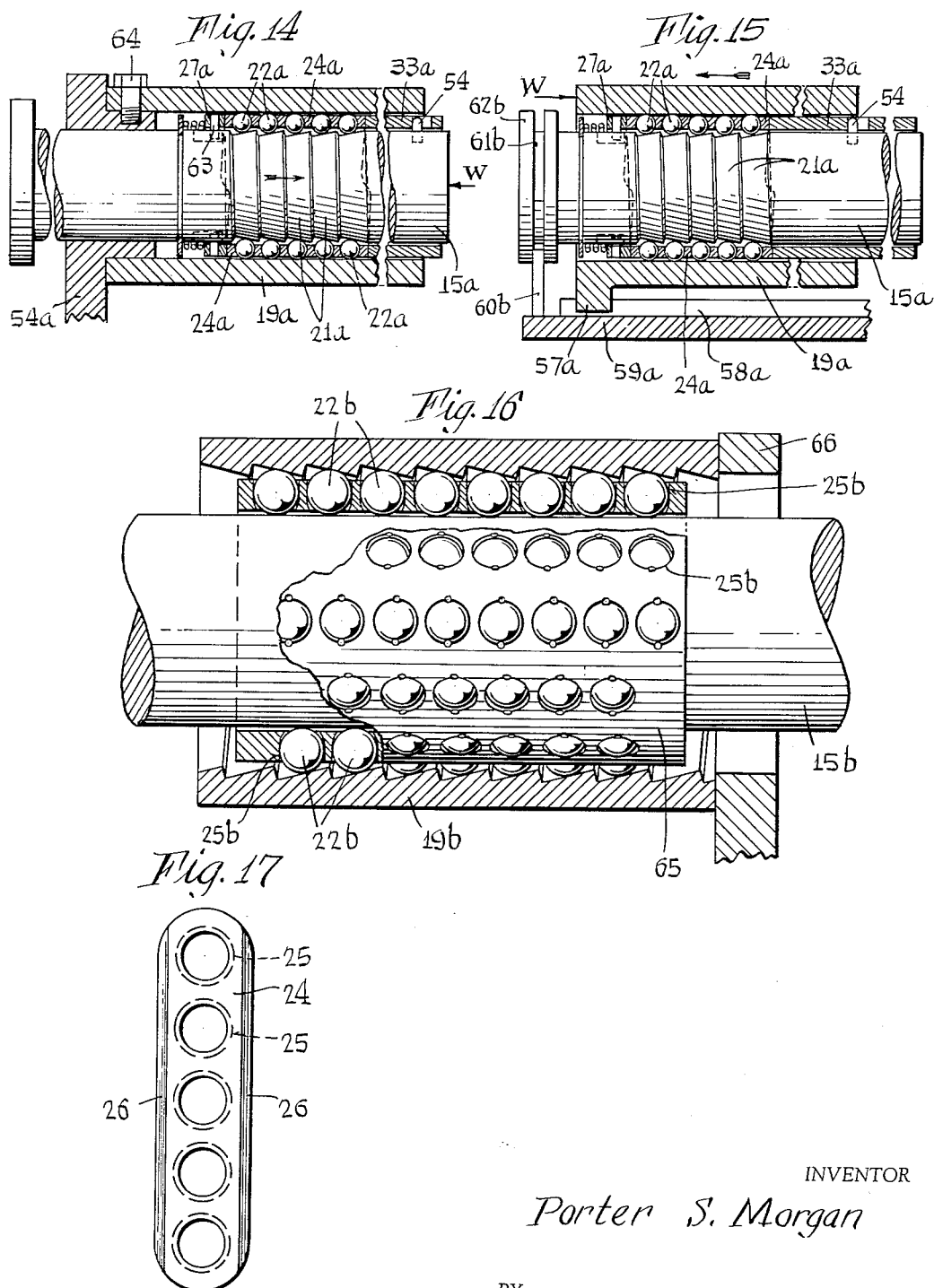

United States Patent Office 2,715,925
Patented Aug. 23, 1955

2,715,925

BALL AND INCLINED RACE MECHANICAL MOVEMENTS

Porter S. Morgan, Westport, Conn., assignor to Morgan Development Laboratories, Inc., Westport, Conn., a corporation of Delaware Application June 12, 1952, Serial No. 293,219

25 Claims. (Cl. 144—305)

This invention relates to devices for producing relative axial movement between a cylindrical member and an encircling member having a cylindrical bore as a result of the rotational displacement of one member relative to the other on the same axis.

Heretofore, the most common mechanical means for accomplishing this result was the screw and nut arrangement in which both the cylindrical member (the screw) and the encircling member (the nut) were provided with threads engaging each other.

I have discovered that, by providing in one only of the relatively movable members a helically disposed race with an inclined face of proper inclination and positioning, a series of balls encircling the rod and lying in said race will wedge between the face of the race and the surface of the plain member and grip the same, with the result that when the member having the race and the plain member are given relative rotary movement the balls follow the helix of the race and while maintaining their gripping relation will cause one of the members to move axially relative to the other and in accordance with the lead of the helical race.

I have further discovered that the wedging race may be on either the cylindrical member or the encircling member, and that the relative movement may be effected by rotation of either member while the other is held against rotation, or that both members may be rotated provided there is relative rotational displacement between them.

The helical race has such depth that axial movement applied directly to the axially movable member in the same direction as the race-imparted movement will free the balls from gripping action and such movement will be unhindered by the balls. As soon as such axial movement ceases, the balls are immediately returned to gripping position and thereby not only prevent retrograde movement of the axially movable member but also cause the axial movement of the member to be resumed upon the turning of the rotatable member without lost motion.

Thus, when the device of the present invention is incorporated in a C-clamp for instance, the movable rod may be quickly manually pushed longitudinally by hand until it engages the work (during which movement the balls are out of gripping position) and then when the advancing movement of the rod is stopped the balls immediately move to gripping position (either by gravity or otherwise) and rotation of the rod then causes the rod to advance until its end engages the work with the desired pressure.

The pressure may be relieved to free the work in the example given by reverse rotation of the rod, or the gripping action of the balls on the rod may be relieved by moving the balls axially of the rod in the direction of the forward advance of the rod.

To facilitate this releasing of the balls by their independent relative movement, not only in the example given above but in other situations, it is preferable that the balls be carried in a retainer so that their movements can be controlled by movement of the retainer axially relative to either of the members. This retainer may be spring-urged in one direction so as to constantly urge the balls into gripping position and may be moved by application of external force, such as manually applied force, against said spring action to release the balls.

In the broader aspects of this invention, the helical race may be in the form of a groove and may include one or more turns with guide means being provided to interconnect the terminals of the groove so that when the balls reach one terminal they may be propelled in the reverse direction to the other terminal, and the interconnecting guide is so arranged that the balls are out of wedging contact with the relatively movable members during their transfer travel.

In its simplest form, however, the helical section of the race may extend for only a fraction of a turn with a ball-freeing return section interconnecting the ends of the helical section. In fact, when desired, the race may have several helical sections each connected by a return ball-freeing section forming an endless race around the member.

While each ball is returning to the other end of the helix, the other balls are maintaining their gripping relation between the members to advance the one relative to the other.

Where the load to be moved or the force to be applied by the axially movable member is excessive for a single annular series of balls, a plurality of such series of balls and races may be used in tandem, thus reducing the compressional strains on each individual ball.

When a continuous single turn race is used as distinguished from a continuous plural turn helical race, it is preferable that each ball be contained in a retainer so that its gripping action may be individually controlled and so that its movement in the return portion of the race may be effected without the balls necessarily engaging the race, and when there are a plurality of annularly endless races in tandem the return portions of the races are preferably aligned on a line parallel to the axis of the member, and in this situation each row of axially aligned balls is preferably carried in one common retainer so that the balls move in unison.

The retainers for the balls, whether the latter are in a single series or in a plurality of tandem series, may be of such width as to evenly space the balls around the annular race.

The ball-guiding race may be provided on the cylindrical member or the sleeve encircling it, depending on the circumstances. Usually it is preferable to have the race on the shorter of the two members.

Other features and advantages will hereinafter appear.

In the accompanying drawings:

Figure 1 is a side view of a C-clamp partly in section and partly broken away, showing the present invention applied thereto.

Fig. 2 is an enlarged view of the device shown in Fig. 1, in which the relatively fixed member is provided with the helical races and the movable member is smooth and without physical alterations.

Fig. 3 is a transverse sectional view taken on the line 3—3 of Fig. 2.

Fig. 4 is an end view of the device of the present invention showing the clamping rod in section, a portion of the retaining ring being broken away to show the underlying parts.

Fig. 5 is a view similar to Fig. 4 but looking at the device from the right as shown in Fig. 1.

Figure 6:
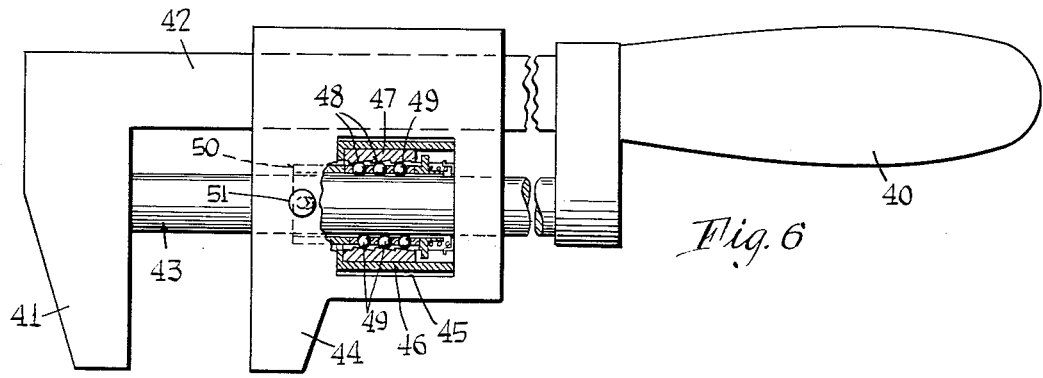
Fig. 6 is a side view partly in section and partly broken away, of a monkey wrench embodying the present invention.

Figs. 8 to 15, inclusive, illustrate various embodiments of the device of the present invention.

Fig. 16 shows another embodiment of the present invention, one in which the balls are carried in helically disposed sockets in a sleeve.

Fig. 17 is a detail view of one of the ball-controlling bars used in the device illustrated in Figs. 1, 2 and 3.

The device of the present invention, while illustrated herein as applied to a C-clamp and to a monkey wrench as exemplary of applications thereof, has utility for load moving and/or sustaining, motion imparting and/or restricting, or other work-performing functions. It is particularly advantageous in the following situations: where an important saving results from avoiding the necessity of providing screw threads on one of the relatively movable members; where the desired rate of axial advance of one member relative to the other for each revolution of the driver would require, due to the low pitch, threads so fine that they could not sustain the load or would be impractical to produce commercially; and/or where a rapid free axial movement of a force-applying member toward the work is desired followed by work-performing force having mechanical advantage.

As in the C-clamp illustration of the present invention, the driven member may be in the form of a plain cylindrical rod without grooves or other physical alterations while the driver is in the form of a sleeve or nut which is held stationary while the rod is either pushed toward the work longitudinally or is rotated to advance toward the work as would a screw. Or, the rod may be a plain cylinder which is held relatively stationary while the sleeve or nut is rotated to produce the relative axial movement between the members. This latter arrangement would have particular advantage in connection with a monkey wrench.

In some situations the arrangement shown in the C-clamp embodiment of the invention may be conveniently reversed and the sleeve or nut may have a plain cylindrical bore while the rod or other cylindrical member within it may be provided on its external surface with helically disposed races. In this situation also either the internal member or the external member, the rod or sleeve for instance, may be rotated to produce the relative axial movement between the members and either member may be the one which moves while the other is stationary or they may both move axially in opposite directions relative to some other member which is relatively fixed depending on the functions to be performed.

So that the novel mechanical principle and novel mode of operation may be understood and their application to perform various functions become apparent, there are disclosed herein several embodiments of the invention.

In Figure 1, I have illustrated a C-clamp having a frame 10 carrying a fixed jaw 11 and a movable jaw 12 having a socket 13 to receive the ball-like end 14 of a clamping rod 15 which extends through a bore 16 in the other arm 17 of the clamp and has on its end a handle 18 by means of which the rod may be rotated or moved axially without rotation as will hereinafter appear. In accordance with the present invention, the rod 15 has a plain smooth cylindrical surface without physical alterations.

A sleeve 19 has a press fit within the bore 16 and one end of the sleeve engages a shoulder 20 in the bore to resist axial movement of the sleeve toward the right as shown in Fig. 1.

The sleeve 19 is, according to the present invention, provided with a series of helically disposed races 21 spaced a predetermined distance from the cylindrical surface of the rod 15. Lying on the races 21 are a series of balls 22 of such diameter as to be simultaneously engageable with the rod 15 and the faces 23 of the races. As is more clearly illustrated in Fig. 2, the faces 23 of the races are inclined toward the axis of the sleeve 19 in the direction of the shoulder 20 and are so spaced from the surface of the rod 15 that the balls may be wedged between the inclined faces 23 and the surface of the rod, or when urged in the opposite direction may be freed from wedging relation between the faces 23 and the surface of the rod.

The extent of inclination of the faces 23 may be varied depending upon the coefficient of friction of the materials employed. I have found that when the parts are formed of steel, if the faces 23 form an angle of 7½ degrees with the surface of the rod, adequate wedging action is produced so that retrograde movement of the rod, i. e. movement of the rod 15 to the right in the example given, is prevented by the gripping action between the approximately opposite surface of the balls and the surfaces of the rod and faces 23 of the races.

The balls 22 are held in spaced relation around the rod 15 by suitable retaining means which, in the construction of the clamp shown in Fig. 1, comprises a series of bars or sticks 24, one of which is shown in Fig. 17, having sockets 25 to receive the balls. The bars 24 are arranged parallel with the axis of the rod 15 and have their adjacent edges 26 abutting as shown in Fig. 3, and thus maintain the balls equi-spaced around the rod.

The bars 24 are engaged simultaneously at their left-hand end, as shown in Figs. 1 and 2, by a presser plate 27 engaged by an expansion spring 28 backed by a snap ring 29 having ears 30 fitting in an annular groove in the end of the sleeve 19, the latter having diametrically opposite slots 31 within which ears 32 on the presser plate ride to prevent rotation of the presser plate. The engagement of the presser plate 27 with the ends of the bars 24 causes the balls to be wedged between the race faces 23 and the surface of the rod 15. The opposite ends of the ball-controlling rods 24 are engaged by a collar 33 slidably mounted on the rod 15 and having a finger piece 34. The collar is prevented from rotating and its outward movement is limited by an abutment which may be in the form of a pin 35 riding in an elongate slot 36. When the finger piece 34 is pushed to the left as shown, it moves all the ball-controlling bars 24 to the left and positions the balls in the diverging portions of the race faces 23 so that the rod 15 may be given retrograde or work-disengaging axial movement without interference from the balls.

According to the present invention, the relative axial movement between the cylindrical rod and its encircling sleeve is produced by causing the races 21 to be helically disposed so that as one or the other of the members is rotated while the balls 22 are in wedging position the balls follow a helical path advancing in work-performing direction and carrying the plain member with them. In some embodiments of this invention, for instance those referred to below, the balls may continuously advance with the axially movable member. However, in the embodiment of the invention shown in Figs. 1 to 6 and 8 to 15, the races 21 do not form a continuous helix but are arranged as endless races or tracks including a helical portion 37 and a return or reverse portion 38 connecting the beginning and end of the helical portion. By this arrangement, while some of the balls are advancing axially with the rod 15 when on the helical portion 37 of the race, others of the annular series of balls are returning from the end of the helical race to the beginning thereof in the reverse portion 38.

To permit this return of the balls from the end to the beginning of the helical race 37, the race in the reverse portion 38 is made deeper as by an undercut or clearance 39. In other words, the undercut portion 39 of the reverse portion 38 of the race is sufficiently spaced from the surface of the rod 15 that during the travel of the balls through the reverse portion the wedging or gripping action between the sleeve 19, the balls 22 and the rod 15 is relieved and the balls may freely return from the end of the groove to the beginning thereof. To facilitate the movement of the balls through the reverse portion 38 of the race, the presser plate 27 and the manual release collar 33 have their working surfaces 27a and 36a shaped like the contour of the races. Hence, as a row of balls reaches the reverse portion 38 of the race, the presser plate urges the ball-controlling bar 24 to the right as shown in Fig. 1, and the extent of such movement is limited by the contour of the collar 33, and the balls of the returning row are freed from any wedging engagement with the return portion 38 of the race and are guided through the enlarged portion thereof by the camming action of the presser plate 27 and collar 33.

Since the rod 15 is plain, i. e. devoid of physical alterations, rotation of the rod, in the form shown in Fig. 1, will cause its immediate advancement in work-performing direction and the rate of advancement depends upon the pitch of the helical portions 37. The maximum steepness of the pitch depends upon the amount of work to be performed, the available power and the strength of materials. The pitch may be as small as desired since there are no grooves or threads on the rod, the dimensions of which would limit their closeness for practical manufacture. With the endless race 21 of the present invention for example, the pitch may be in the order of ten thousands of an inch per revolution if desired, depending upon the degree of precision with which it is possible to cut the race.

The present invention is based on my discovery that a series of balls wedged between the inclined surface of a helically disposed race on one member and a plain cylindrical surface of another member so as to prevent relative axial movement of the members in one direction, when caused to rotate by the rotation of either member will follow the helix of the race while maintaining rolling line wedging engagement with the inclined and plain surfaces with the result that one member being held against axial movement, the other will advance axially.

Figure 7:
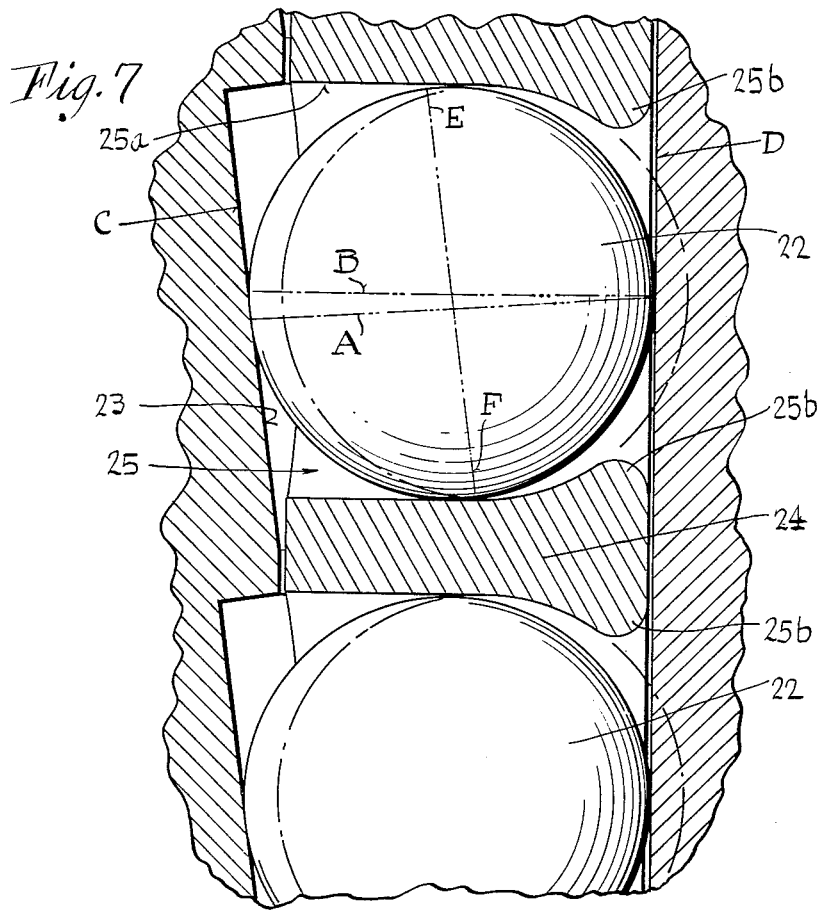
Fig. 7 is a greatly enlarged view showing the relationship between the balls, the inclined races and the plain surface against which the balls are clamped, and also showing in section the ball-controlling bars.

By referring to Fig. 7 it will be seen that the rolling line contact A of the ball is offset from the equator B of the ball due to the angular relation between the surfaces C and D, being 7½° in the example given. Thus, the balls in traveling around the rod rotate approximately on the axes E—F and are caused to advance by rolling up the inclined helical track.

One of the advantages of the arrangement shown in Fig. 2, in which the race is endless and has a return portion, is that when the ball is returning from the end to the beginning of the helical race it is free to shift its position. Hence, when it reengages the inclined face of the race the chances are that the rolling line of contact on the ball will be different from what it was in the previous cycle. Thus, there are presented an infinite number of lines of contact and therefore the wear on the balls will be distributed.

As indicated above, according to the present invention either the rod or the sleeve may be rotated to produce the relative movement between the members. An example of the arrangement wherein the sleeve is the rotating and traveling member is shown in Fig. 6 where another exemplary embodiment of the invention is illustrated as applied to a monkey wrench. As shown, the wrench comprises a handle portion 40 having a fixed jaw 41 on a bar 42 and guide rod 43. A movable jaw 44 is slidably mounted on the bar 42 and rod 43 for movement toward and from the fixed jaw 41. Within a cavity 45 in the movable jaw there is located a sleeve 46 having within it another sleeve 47 on the inner surface of which are the inclined helically disposed races 48 which are endless and have helical and return portions as in Fig. 2. There are three series of balls 49 and these are controlled by spring-pressed manually released ball-controlling arms, the same as in Fig. 2. To operate the retainers manually and thus release the balls, a releasing sleeve 50 is provided with a handle 51 projecting through the jaw.

In the operation of this embodiment of my invention, when the movable jaw 44 is slid up to engage a nut or other part to be gripped and operated, the balls are moved to the releasing position in the races and are returned to wedging position by the action of the spring when the work is engaged and the longitudinal finger pressure on the movable jaw is released. Then the sleeve 46 is rotated to advance the movable jaw to produce the desired pressure on the work.

Various arrangements of the device of the present invention in which the rod is plain and the sleeve is provided with the helically disposed races are illustrated in Figs. 8 to 11 in which the same reference numerals are applied to the parts as those applied to the parts in Fig. 2.

In Fig. 8 the rod 15 is relatively fixed, as in the example of the invention disclosed in Fig. 6, while rotation is applied to the sleeve 19 as by a gear 52 meshing with a long pinion 53. Rotation of the sleeve 19 causes the sleeve to travel in the direction of the arrow.

In Fig. 9 the sleeve 19 is held against travel by fixed bearings 54 and 55 and when rotated causes the rod 15, which may be held against rotation by the work, to travel in the direction of the arrow.

In Fig. 10 the sleeve is held against travel by the bearings 54 and 55 and it is held against rotation by the pin 56. Rotation of the rod 15 causes it to travel in the direction of the arrow.

In Fig. 11 the sleeve 19 is free to travel on the rod 15 but is held against rotation by a spline connection 57—58 with a stationary member 59, while the rod 15 may rotate while held against travel by a stationary pin 60 riding in an annular groove 61 of a collar 62 on the rod. As the rod 15 rotates without travel, the sleeve 19 travels but does not rotate.

The examples of the application of the device of the present invention might be multiplied by combinations of the various embodiments illustrated. For instance, where one member is described as being "stationary," this term is used merely in a relative sense. For instance, the stationary member could move in the same direction as the movable member or in a reverse direction, the important consideration being that there is relative movement between the members.

As pointed out above, the arrangement of the races shown in Figs. 1 to 11 may be reversed. Thus, as shown in Figs. 12 to 15, the inclined ball races may be formed on the rod while the sleeve has a plain smooth surface.

Referring to Figs. 12 to 15, the rod 15a is provided with endless helically disposed races 21a like those in Fig. 2, while the sleeve 19a has a plain smooth internal surface. The balls 22a are located in the space between the sleeve 19a and the race 21a and are controlled by bars 24a like the bars 24 in the form shown in Fig. 2. The presser plate 27a is spring-pressed and splined to the rod 15a by a pin 63 while the collar 33a is splined to the rod 15a by a pin 54.

In Fig. 12 the rod 15a is fixed against turning and traveling and the sleeve is rotated by a gear 52a engaging a pinion 53a. Thus, when the sleeve is rotated, it will travel along the rod 15a to perform work in the direction of the arrow.

In Fig. 13 the structure is the same as that in Fig. 12 except that the rod 15a is free to travel but not turn while the sleeve 19a may turn but not travel, the fixed bearing 54a having an arm 60a riding in an annular groove 61a in the sleeve 19a while the rod 15a is held against rotation but is permitted to travel.

In the arrangement shown in Fig. 14, the rod 15a rotates and travel while the sleeve 19a is anchored by the screw 64 to the bearing 54a against both travel and rotation.

In Fig. 15 the rod 15a rotates but does not travel while the sleeve 19a travels but does not rotate. The rod 15a has a collar 62b provided with an annular groove 61b in which a stop pin 60b is located and the sleeve 19a having a tongue 57a riding in a slot 58a in a stationary plate 59a.

As is the case with the construction shown in Figs. 8 to 11, in the construction shown in Figs. 12 to 15 the members which are stationary may, if desired, be movable members but move in a direction opposite to that of the other member, or they may move with said other member but at a different rate, the point being that there is relative movement between the members.

According to the present invention in its broader aspects, the races for the balls may be in the form of a continuous helix as shown in Fig. 16. In this embodiment of the invention, the balls 22b are carried in sockets 25b, the centers of which are located on a helical line in a sleeve 65 which thereby maintains the balls in spaced relation. As relative rotary movement is produced between the sleeve 19b and the rod 15b, the balls roll up the helical inclined faces which may, as shown, be formed by grooving the surface of the sleeve and thus advance the rod 15b and sleeve 19b axially relatively. Since the balls have an epicyclic movement progressing along a helical path, the rotation of the ball-carrying sleeve 65 will also cause it to advance axially and will work its way in and out of the race-carrying sleeve during the operation of the device, but this is not objectionable in many cases especially where the relative axial movement to be obtained between the rod and the sleeve is not great.

The ball-carrying sleeve 65 may be urged to the right, as shown in Fig. 16, in any suitable manner to cause the balls to wedge between the inclined surfaces of the races and the cylindrical surfaces of the rod 15b. In many situations, no mechanical means need be provided for this purpose. For instance, when the device is used so that the rod 15b is vertical, the weight of the sleeve 65 and the balls which it carries is sufficient to produce the wedging action. In other situations with the load applied to the rod 15b on the left end as shown in Fig. 16 and absorbed by a fixed support 66 against which the sleeve 19b bears, the friction between the balls and the surfaces engaged will itself be sufficient to cause the balls to assume a wedging position between the inclined surfaces and the cylindrical surface.

Referring to the specific construction shown in Fig. 1, to prevent the movable jaw 12 from turning with the rod and thus walking off the work when being tightened against it, the ball-like end 14 has a tip or rounded point 14a located on the axis of the rod. Thus, when the end 14 is rotated, it will turn on a center, so to speak, and have practically no tendency to cause rotation or wobbling of the member jaw.

The clamping device of the present invention can be so powerful that in most situations long slide bars, usually found on C-clamps to turn the screw, are not necessary, and accordingly the handle 18 may be small and have short wings 18a similar to a wing nut. Even with this small handle, the power which may be applied by the device of the present invention may be so great as to spring or break the frame 10, and to avoid this the end of the rod 15 is provided with a cone 67 while the handle 18 has a conical socket 68. The end of the rod has a spring 69 bearing on the handle tending to force the conical socket tightly over the conical portion 67 on the rod. When the torque applied to the handle becomes excessive, the handle slips on the conical end of the shaft and damage to the parts is avoided.

As shown in Figs. 2 and 7, each of the ball-controlling bars 24 has a socket 25 for one ball in each series. The part 25a of the socket 25 from somewhat beyond the centerline of the balls to the side facing the inclined race is cylindrical and has a diameter slightly larger than that of the ball. Therefore, the balls may be inserted through the hole thus formed. At the other side of the bar 24 the socket is partially closed by the overhanging part 25b which keeps the ball from falling out of the socket until the rod 15 is inserted or when it is removed. The overhanging part 25b is short enough, however, to permit the ball to move from the full to the dot-and-dash line position shown in Fig. 7, so as to pass by the projecting ends of the races when the bars are slid into the sleeve 19 in being assembled. The bars 24 having radial sides are held in place by mutual engagement as with stones in an arch. When the bars are in place, the rod 15 is slid into the hole thus formed by the bars and ball.

In the form of the invention shown in Fig. 16 the balls are retained in the sockets in the sleeve 65 by peening over slightly the edges of the holes through which the balls pass.

Variations and modifications may be made within the scope of the claims and portions of the improvements may be used without others.

I claim:

1. A device comprising a sleeve member having a cylindrical bore, a cylindrical member fitting within said bore, one only of said members having on its surface facing the other member a helically disposed flat race, the face of which is inclined toward the other member and spaced therefrom, a series of spaced balls encircling the cylindrical member and riding on said race in the space between the face thereof and the surface of the other member, the inclination of the face of the race and the position thereof causing the balls to wedge between said race face and the surface of the other member and prevent axial movement between the members in one direction and cause relative axial movement between the members in the other or work-performing direction as the wedged balls travel on the helically disposed race in response to relative rotation between the members, a portion of the face of the race being sufficiently spaced from the other member to free the balls from the latter and permit relative axial movement between the cylindrical member and the sleeve member in work-performing direction without necessarily rotating the members relative to each other.

2. The invention as defined in claim 1, in which there are means for releasing all of said balls from said wedging position.

3. A device comprising a sleeve member having a cylindrical bore, a cylindrical member fitting within said bore, the sleeve member only having on its surface facing the cylindrical member a helically disposed flat race, the face of which is inclined toward the cylindrical member and spaced therefrom, a series of spaced balls encircling the cylindrical member and riding on said race in the space between the face thereof and the surface of the cylindrical member, the inclination of the face of the race and the position thereof causing the balls to wedge between said race face and the surface of the cylindrical member and prevent axial movement between the members in one direction and cause relative axial movement between the members in the other or work-performing direction as the wedged balls travel in the helically disposed race in response to relative rotation between the members, a portion of the face of the race being sufficiently spaced from the cylindrical member to free the balls therefrom and permit relative axial movement between the cylindrical member and the sleeve member in work-performing direction without necessarily rotating the members relative to each other.

4. A device comprising a sleeve member having a cylindrical bore, a cylindrical member fitting within said bore, the cylindrical member only having on its surface facing the sleeve member a helically disposed flat race, the face of which is inclined toward the sleeve member and spaced therefrom, a series of spaced balls encircling the cylindrical member and riding on said race in the space between the face thereof and the surface of the sleeve member, the inclination of the face of the race and the position thereof causing the balls to wedge between said race face and the surface of the sleeve member and prevent axial movement between the member in one direction and cause relative axial movement between the members in the other or work-performing direction as the wedged balls travel in the helically disposed race in response to relative rotation between the members, a portion of the face of the race being sufficiently spaced from the sleeve member to free the balls therefrom and permit relative axial movement between the cylindrical member and the sleeve member in work-performing direction without necessarily rotating the members relative to each other.

5. A device comprising a sleeve member having a cylindrical bore, a cylindrical member fitting within said bore, one only of said members having in its surface a plurality of endless flat races each including a helical portion of less than one turn and a reverse portion connecting the beginning and end of the helical portion, the face of which is inclined toward the other member and spaced therefrom, a plurality of endless series of spaced balls, each series encircling the cylindrical member and riding in one of said races in the space between the face thereof and the surface of the other member, the inclination of the face of the race and the position thereof causing the balls to wedge between said race face and the surface of the other member and prevent axial movement between the members in one direction and cause relative axial movement between the members in the other or work-performing direction as the wedged balls travel in the helically disposed race in response to relative rotation between the members, a portion of the face of the race being sufficiently spaced from the other member to free the balls therefrom and permit relative axial movement between the cylindrical member and the sleeve member in work-performing direction without necessarily rotating the members relative to each other, and means for releasing the balls from said wedging action when traveling through said reverse portion of the race to the beginning of the helical portion.

6. A device comprising a sleeve member having a cylindrical bore, a cylindrical member fitting within said bore, one only of said members having in its surface a plurality of endless flat races each including a helical portion of less than one turn and a reverse portion connecting the beginning and end of the helical portion, the face of which is inclined toward the other member and spaced therefrom, a plurality of endless series of spaced balls, each series encircling the cylindrical member and riding in one of said races in the space between the face thereof and the surface of the other member, the inclination of the face of the race and the position thereof causing the balls to wedge between said race face and the surface of the other member and prevent axial movement between the members in one direction and cause relative axial movement between the members in the other or work-performing direction as the wedged balls travel in the helically disposed race in response to relative movement between the members, a portion of the face of the race being sufficiently spaced from the other member to free the balls therefrom and permit relative axial movement between the cylindrical member and the sleeve member in work-performing direction without necessarily rotating the members relative to each other, and the reverse portion of the race having its face spaced from the surface of the other member sufficiently to release the ball located therein from its wedging action for free return to the beginning of the helical portion.

7. The invention as defined in claim 6, in which there are means for simultaneously releasing all of said balls from said wedging position.

8. A device comprising a sleeve member having a cylindrical bore, a cylindrical member fitting within said bore, the sleeve member only having in its surface a plurality of endless flat races each including a helical portion of less than one turn and a reverse portion connecting the beginning and end of the helical portion, the face of which is inclined toward the cylindrical member and spaced therefrom, a plurality of endless series of spaced balls each series encircling the cylindrical member and riding in one of said races in the space between the face thereof and the surface of the cylindrical member, the inclination of the face of the race and the position thereof causing the balls to wedge between said race face and the surface of the cylindrical member and prevent axial movement of the latter in one direction and cause relative axial movement between the members in the other or work-performing direction as the wedged balls travel in the helically disposed race in response to relative rotation between the members, a portion of the face of the race being sufficiently spaced from the cylindrical member to free the balls therefrom and permit relative axial movement between the cylindrical member and the sleeve member in work-performing direction without necessarily rotating the members relative to each other, and the reverse portion of the race having its face spaced from the surface of the cylindrical member sufficiently to release the ball located therein from its wedging action for free return to the beginning of the helical portion.

9. A device comprising a sleeve member having a cylindrical bore, a cylindrical member fitting within said bore, the cylindrical member only having in its surface a plurality of endless flat races each including a helical portion of less than one turn and a reverse portion connecting the beginning and end of the helical portion, the face of which is inclined toward the sleeve member and spaced therefrom, a plurality of endless series of spaced balls each series encircling the cylindrical member and riding in one of said races in the space between the face thereof and the surface of the sleeve member, the inclination of the face of the race and the position thereof causing the balls to wedge between said race face and the surface of the sleeve member and prevent axial movement of the latter in one direction and cause relative axial movement between the members in the other or work-performing direction as the wedged balls travel in the helically disposed race in response to relative rotation between the members, a portion of the face of the race being sufficiently spaced from the sleeve member to free the balls therefrom and permit relative axial movement between the cylindrical member and the sleeve member in work-performing direction without necessarily rotating the members relative to each other, and the reverse portion of the race having its face spaced from the surface of the sleeve member sufficiently to release the ball located therein from its wedging action for free return to the beginning of the helical portion.

10. The device as defined in claim 5, in which there is a plurality of elongate ball-controlling bars lying between the cylindrical member and the sleeve parallel to each other and to the axes of said members, each bar having a row of sockets, one for a ball in each series of balls, and means for spacing the bars equi-distantly around the cylindrical member.

11. The device as defined in claim 10, in which adjacent ball-controlling bars have their longitudinal edges abutting to space themselves and the balls equi-distantly around the cylindrical member.

12. The device as defined in claim 10, in which the bars are relatively longitudinally movable and are each yieldingly urged to move the balls controlled by it through said reverse portion of the race to the beginning of the helical portion thereof.

13. The device as defined in claim 10, in which the bars are relatively longitudinally movable and are each yieldingly urged to move the balls controlled by it toward said wedging position.

14. The device as defined in claim 10, in which the bars are relatively longitudinally movable and are each yieldingly urged to move the balls controlled by it toward said wedging position, and means engaging said bars for simultaneously releasing all of said balls from said wedging position.

15. A device comprising a sleeve member having a cylindrical bore, a cylindrical member fitting within said bore, one only of said members having on its surface facing the other member a helically disposed flat race, the face of which is inclined toward the other member and is spaced therefrom, a series of spaced balls encircling the cylindrical member and riding in said race in the space between the face of the race and the surface of the other member, the inclination of the face of the race and the position thereof causing the balls to wedge between said race face and the surface of the other member and prevent axial movement between the members in one direction and cause relative axial movement between the members in the other direction as the wedged balls travel in the helically disposed race in response to relative rotation between the members.

16. A device comprising a sleeve member having a cylindrical bore, a cylindrical member fitting within said bore, one only of said members having on its surface facing the other member a helically disposed flat race, the face of which is inclined at an angle of approximately 7½° toward the other member and is spaced therefrom, a series of spaced balls encircling the cylindrical member and riding in said race in the space between the face of the race and the surface of the other member, the inclination of the face of the race and the position thereof causing the balls to wedge between said race face and the surface of the other member and prevent axial movement between the members in one direction and cause relative axial movement between the members in the other direction as the wedged balls travel in the helically disposed race in response to relative rotation between the members.

17. A device comprising a sleeve member having a cylindrical bore, a cylindrical member fitting within said bore, one only of said members having on its surface facing the other member a helically disposed flat race, the face of which is inclined toward the other member and is spaced therefrom, the surface of the other member being plain and devoid of physical alterations, a series of spaced balls encircling the cylindrical member and riding in said race in the space between the face of the race and the surface of the other member, the inclination of the face of the race and the position thereof causing the balls to wedge between said race face and the surface of the other member and prevent axial movement between the members in one direction and cause relative axial movement between the members in the other direction as the wedged balls travel in the helically disposed race in response to relative rotation between the members.

18. A device comprising a sleeve member having a cylindrical bore, a cylindrical member fitting within said bore, one only of said members having on its surface facing the other member a flat race, the face of which is inclined toward the other member and is spaced therefrom, a series of spaced balls encircling the cylindrical member and riding in said race in the space between the face of the race and the surface of the other member, the inclination of the face of the race and the spacing thereof from the surface of the other member causing the balls to wedge between said race face and the surface of the other member and prevent axial movement between the members in one direction and permit relative axial movement between the members in the other direction as the wedged balls travel in the race in response to relative rotation between the members.

19. The invention as defined in claim 18, in which there are releasable means for urging the balls toward said wedging position.

20. A clamp having a frame having a stationary clamping member and a movable clamping member, a cylindrical rod connected to said movable clamping member, a cylindrical sleeve secured in said frame and surrounding said rod, said sleeve having on its surface facing the rod a helically disposed flat faced groove, the face of which is inclined toward the rod and is spaced therefrom, a series of balls encircling the rod and lying in said groove in the space between the face of the groove and the surface of the rod, the inclination of the face of the groove and the position thereof causing the balls to wedge between the groove face and the surface of the rod and prevent axial movement between the rod and the sleeve in one direction and cause axial movement of the rod relative to the sleeve in clamping direction as the wedged balls travel in the helically disposed groove in response to rotation of the rod.

21. A clamp as defined in claim 20, in which a portion of the face of the groove is sufficiently spaced from the rod to free the balls from the rod and permit relative axial movement of the rod and clamping member carried thereby relative to the sleeve to the stationary clamping member without necessarily rotating the rod relative to the sleeve.

22. A clamp as defined in claim 21, in which there are means for yieldingly urging the balls to wedging position, and manually operated means for moving the balls out of wedging position to free the rod and clamping member carried thereby for axial movement away from the stationary clamping member.

23. A clamp as defined in claim 20, in which there is a plurality of endless grooves in the sleeve, each including a helically disposed portion of less than one turn and a return portion connecting the beginning and end of the helical portion, there being an annular series of balls in each endless groove and the return portion of each groove having its face spaced from the rod a distance greater than the helically disposed portion to free the returning balls from wedging within said return portion.

24. A clamp as defined in claim 23, in which there is a plurality of ball-controlling bars arranged in parallel relation and spaced around the rod parallel to the axis thereof, each controlling one ball in each annular series and controlling the movement of the balls into and out of wedging position.

25. A clamp as defined in claim 24, in which there is a spring-operated presser ring engaging the bars at their one ends to urge the balls to wedging position, and a releasing ring engaging the bars at their other ends movable to force the balls out of wedging position when manually operated.

References Cited in the file of this patent

UNITED STATES PATENTS

| | | |
|---|---|---|
| 298,704 | Norris et al. | May 13, 1884 |
| 857,632 | Kihlgren | June 25, 1907 |
| 1,846,422 | Hands | Feb. 23, 1932 |
| 2,350,538 | Selnes | June 6, 1944 |
| 2,396,823 | Burbank et al. | Mar. 19, 1946 |
| 2,409,545 | Cornwell | Oct. 15, 1946 |